United States Patent
Chen

(10) Patent No.: US 7,682,119 B2
(45) Date of Patent: Mar. 23, 2010

(54) SCREW FOR FASTENING WOODEN MATERIALS

(75) Inventor: Chun-Yen Chen, Kaohsiung (TW)

(73) Assignee: Sheh Fung Screws Co., Ltd., Taipei (TW)

( * ) Notice: Subject to any disclaimer, the term of this patent is extended or adjusted under 35 U.S.C. 154(b) by 0 days.

(21) Appl. No.: 12/189,678

(22) Filed: Aug. 11, 2008

(65) Prior Publication Data

US 2009/0162165 A1    Jun. 25, 2009

(30) Foreign Application Priority Data

Dec. 24, 2007    (TW) ............................. 96221962 U

(51) Int. Cl.
*F16B 35/04* (2006.01)
(52) U.S. Cl. ..................... 411/411; 411/412; 411/424; 411/415
(58) Field of Classification Search ................ 411/411, 411/412, 413, 389, 424, 387.2, 387.4
See application file for complete search history.

(56) References Cited

U.S. PATENT DOCUMENTS

| | | | | |
|---|---|---|---|---|
| 4,653,244 A | * | 3/1987 | Farrell | 52/745.21 |
| 6,022,177 A | * | 2/2000 | Hofer | 411/412 |
| 6,074,149 A | * | 6/2000 | Habermehl et al. | 411/442 |
| 7,037,059 B2 | * | 5/2006 | Dicke | 411/413 |
| 7,367,768 B2 | * | 5/2008 | McGovern et al. | 411/412 |
| 2007/0128001 A1 | * | 6/2007 | Su | 411/413 |
| 2007/0154285 A1 | * | 7/2007 | Tong | 411/387.2 |
| 2007/0217887 A1 | * | 9/2007 | Lin | 411/413 |

* cited by examiner

*Primary Examiner*—Jack W Lavinder
*Assistant Examiner*—David Reese
(74) *Attorney, Agent, or Firm*—Christie, Parker & Hale, LLP.

(57) ABSTRACT

A screw includes a shank portion including a tapered bottom section having a tip, a head on top of the shank portion, and first and second helical threads. The first helical thread extends helically around the shank portion in a first direction between the tip and the head, and has a first end distal from the head, and a second end opposite to the first end. The second helical thread extends helically around the shank portion in a second direction between the first helical thread and the tip, and has a third end proximate to the second end of the first helical thread. The first and second directions are opposite to each other. A non-helical ridge extends around the shank portion between the first and second helical threads.

5 Claims, 4 Drawing Sheets

SCREW FOR FASTENING WOODEN MATERIALS

CROSS-REFERENCE TO RELATED APPLICATION

This application claims priority of Taiwanese Application No. 096221962, filed on Dec. 24, 2007.

BACKGROUND OF THE INVENTION

1. Field of the Invention

This invention relates to a screw, more particularly to a screw for fastening wooden materials.

2. Description of the Related Art

Referring to FIG. 1, a conventional screw 13 used for coupling overlapping first and second wooden materials 11, 12 includes a head 131, a shank portion 132 extending from the head 131 and having a tip opposite to the head 131, and a helical thread 133 extending helically around the shank portion 132 between the head 131 and the tip. To use the screw 13, a rotating torque is applied to the head 131 by a tool (not shown) so as to drive the shank 132 through the first wooden material 11 and into the second wooden material 12, thereby coupling tightly the first and second wooden materials 11, 12.

Since the first and second wooden materials 11, 12 have strong fiber textures, when the screw 13 is rotated, the helical thread 133 rotates destructively into the first and second wooden materials 11, 12, and cuts through the fiber textures so as to facilitate extension of the shank portion 132 therethrough. However, since the single-direction rotation of the helical thread 133 cannot completely cut the fiber textures of the first and second wooden materials 11, 12, the shavings 14 produced thereof are rough, and are easily tangled around the screw 13, so that the shavings 14 are stuck either inside or at the surface of the first wooden material 11. Thus, not only is a tightening resistance of the screw 13 large and a penetrating force thereof low, but also, the screw 13 cannot completely and tightly interconnect the first and second wooden materials 11, 12. Moreover, when the first and second wooden materials 11, 12 are subjected to an external force, the conventional screw 13 tends to rotate in a reverse direction of the helical thread 133 so as to be loosened.

SUMMARY OF THE INVENTION

Therefore, the object of the present invention is to provide a screw that is suitable for coupling wooden materials and that is capable of overcoming the aforementioned drawbacks of the prior art.

According to this invention, a screw comprises a shank portion, a head on top of the shank portion, a first helical thread, a second helical thread, and a non-helical ridge. The shank portion includes a tapered bottom section having a tip. The first helical thread extends helically around the shank portion in a first direction between the tip and the head, and has a first end distal from the head, and a second end opposite to the first end. The second helical thread extends helically around the shank portion in a second direction between the first helical thread and the tip, and has a third end proximate to the second end of the first helical thread. The first and second directions are opposite to each other. The non-helical ridge extends around the shank portion between the first and second helical threads.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
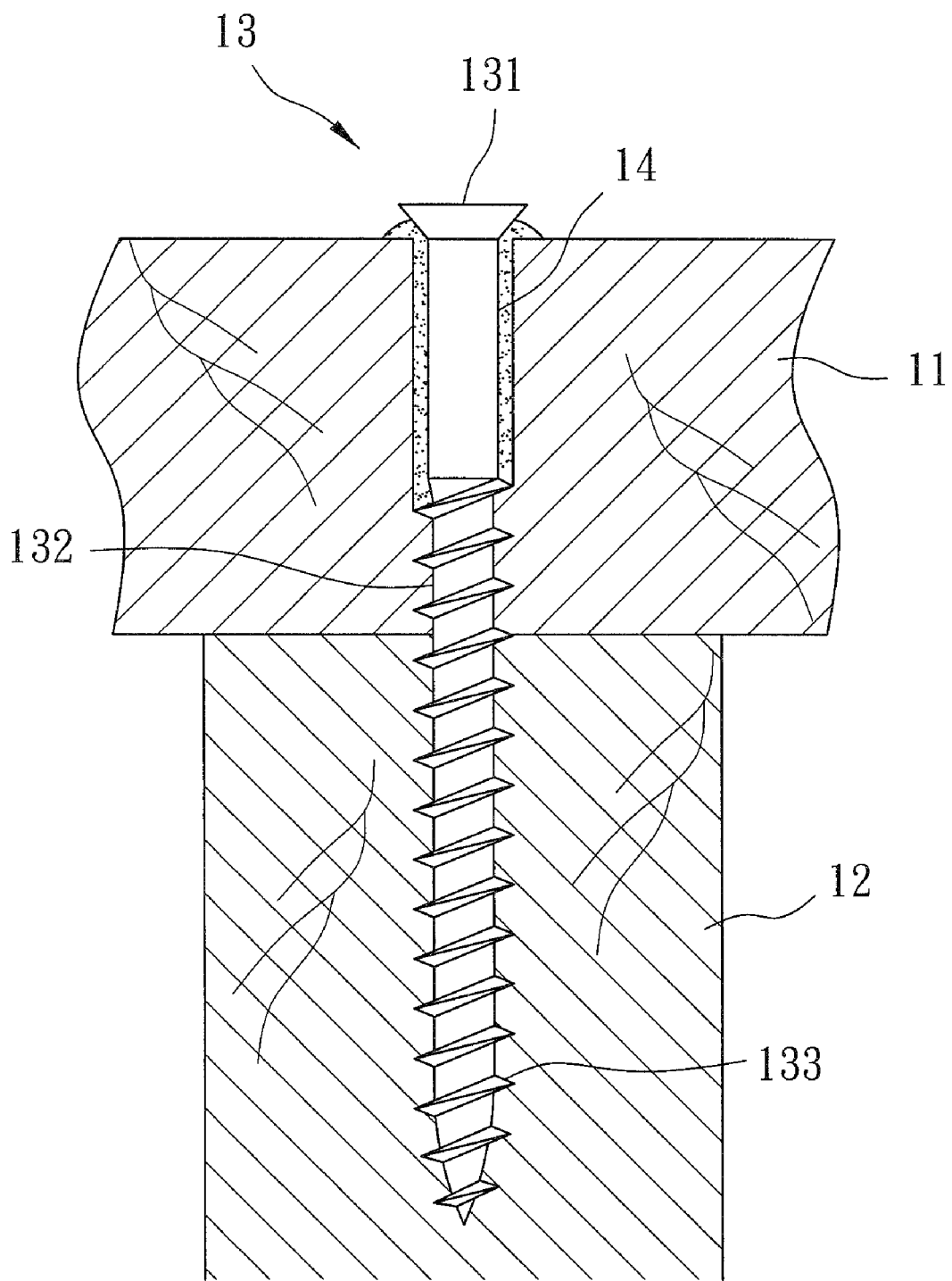
FIG. 1 is a schematic view of a conventional screw in a state of use.

Before the present invention is described in greater detail, it should be noted that the same reference numerals have been used to denote like elements throughout the specification.

Figure 2:
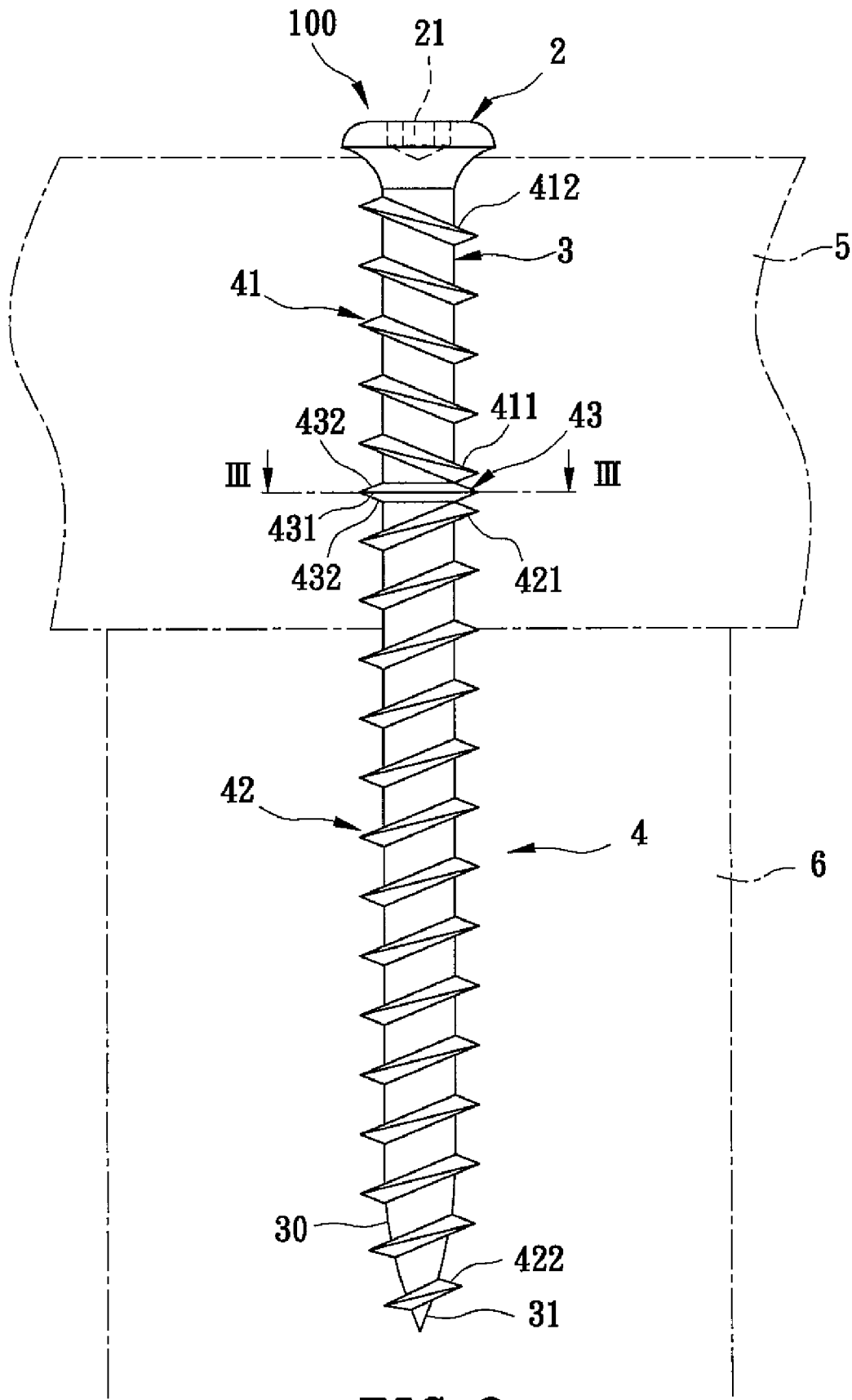
FIG. 2 is a schematic view of a screw according to the first preferred embodiment of the present invention.
Figure 3:
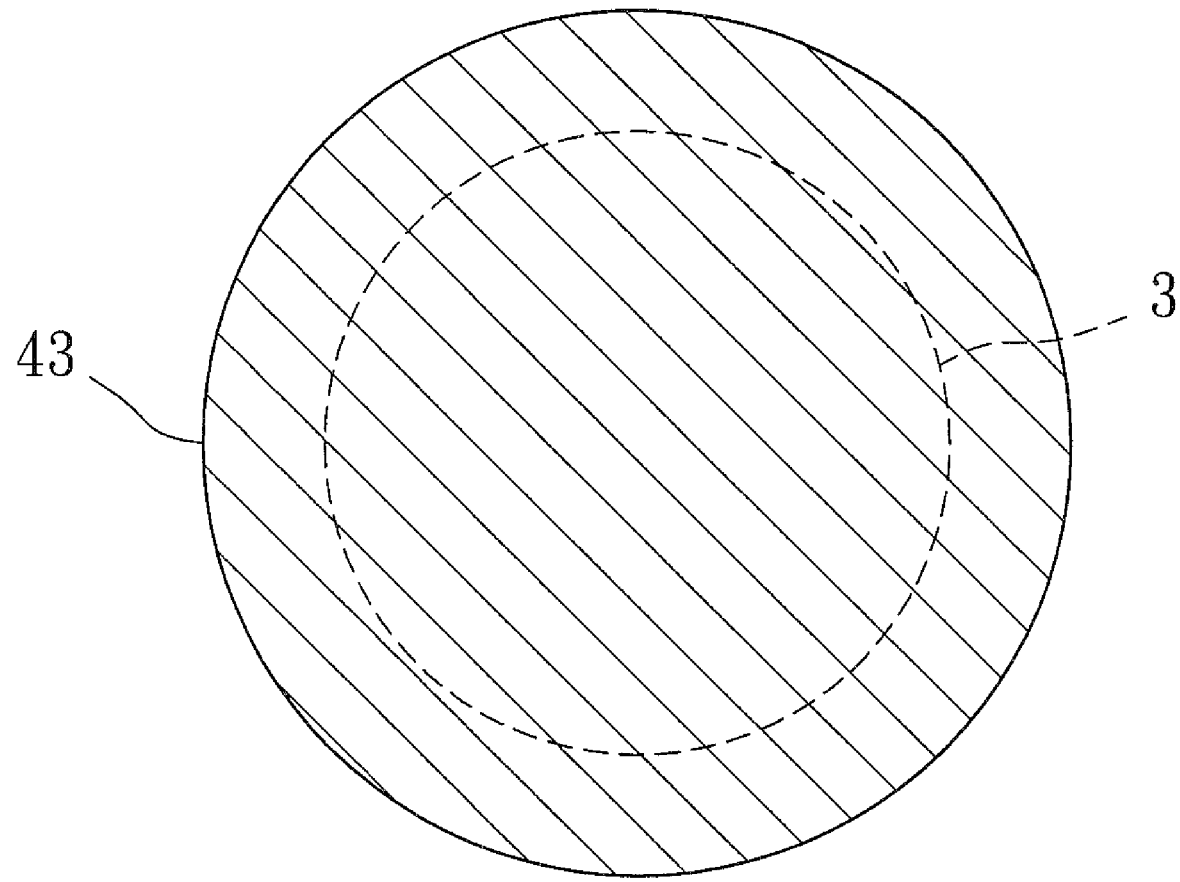
FIG. 3 is a sectional view of the first preferred embodiment taken along line III-III of FIG. 2.

Referring to FIGS. 2 and 3, a screw 100 according to the first preferred embodiment of the present invention is shown to comprise a head 2, a shank portion 3, a first helical thread 41, a second helical thread 42, and a non-helical ridge 43.

The head 2 is formed with a groove 21 that is adapted to receive a tool (not shown) for rotating the screw 100. The groove 21 may be rectangular, cruciform, or slotted in shape.

The shank portion 3 extends downwardly from the head 2, and includes a tapered bottom section 30 having a tip 31 opposite to the head 2.

The first helical thread 41 extends helically around the shank portion 3 in a first direction between the tip 31 and the head 2, and has a first end 411 distal from the head 2, and a second end 412 opposite to the first end 411. In this embodiment, the second end 412 is proximate to the head 2.

The second helical thread 42 extends helically around the shank portion 3 in a second direction between the first helical thread 41 and the tip 31, and has a third end 421 proximate to the first end 411, and a fourth end 422 proximate to the tip 31. The first and second directions are opposite to each other.

The non-helical first ridge 43 extends around the shank portion 3 between the first and second helical threads 41, 42, and has a non-helical crest 431 extending around the shank portion 3, and two inclined faces 432 tapering from the crest 431 in opposite directions. In this embodiment, the inclined faces 432 of the first ridge 43 are respectively in contact with the first end 411 of the first helical thread 41 and the third end 421 of the second helical thread 42.

As best shown in FIG. 3, in the first preferred embodiment, the first ridge 43 extends around the shank portion 3 on a diametral plane of the shank portion 3.

With reference to FIG. 2, in use, during connection of a first wooden material 5 (shown in phantom lines) to a second wooden material 6 (shown in phantom lines) by the screw 100, the second helical thread 42 is first driven into the first and second wooden materials 5, 6 so as to cut the fiber textures of the first and second wooden materials 5, 6, thereby producing shavings (not shown). Since the first helical thread 41 extends in the first direction which is different from the second direction of the second helical thread 42, when the shavings are pushed upwardly by the second helical thread 42, the shavings can be further cut by the first helical thread 41 and the first ridge 43. Moreover, since the first ridge 43 extends around the shank portion 3 on the diametral plane thereof, the shavings in contact with the first helical thread 41 are supported by the first ridge 43, so that when the first helical thread 41 is rotated, fiber textures of the shavings can be thoroughly destroyed and cut. Hence, the shavings become fine and dense.

Through the aforementioned two-stage cutting of the shavings, the problem involving entanglement of the shavings with the screw 100 is resolved. Further, since the shavings of the first and second wooden materials 5, 6 are fine, they may be tightly compressed by the first and second helical threads 41, 42 and the first ridge 43 during rotation of the screw 100. Therefore, the first and second wooden materials 5, 6 can be connected more securely to each other. Moreover, since the non-helical first ridge 43 is on the diametral plane of the shank portion 3, not only is the screw 100 prevented from loosening when subjected to an external force, but the first ridge 43 can also assist in pressing down a portion of the shavings produced by the second helical thread 42 and in cutting the shavings produced by the first helical thread 41, thereby preventing entanglement between the screw 100 and the shavings. As such, the tightening resistance of the screw 100 is reduced, and the penetrating force of the screw 100 is enhanced.

Referring to Charts 1 and 2, comparisons are made between the screw 100 of the present invention and a conventional double-thread screw which are screwed into a composite material and a wooden material at a rotating speed of 1500 rpm and a load of 16 kgs:

CHART 1

Comparison of screwing torques for the screw 100 and the conventional double-thread screw

|  | Screw (100) | Double-thread Screw |
|---|---|---|
| Test I | 3.2 N-m | 3.5 N-m |
| Test II | 3.3 N-m | 3.6 N-m |
| Test III | 3.2 N-m | 3.5 N-m |
| Test IV | 3.2 N-m | 3.5 N-m |
| Average | 3.225 N-m | 3.525 N-m |

CHART 2

Heights of the heads of the screw 100 and the conventional double-thread screw from an outer surface of an object after the screw 100 and the conventional double-thread screw are driven into the object

|  | Screw (100) | Double-thread Screw |
|---|---|---|
| Test I | 0.36 mm | 0.46 mm |
| Test II | 0.33 mm | 0.48 mm |

When the screwing torque is high, the screw is more likely to experience a pause when the screw thread thereof is driven into an object, so that the penetrating force of the screw is poor. It is apparent from chart 1 that the average screwing torque for the screw 100 is 3.225 N-m, which is lower than that of the conventional double-thread screw which is 3.525 N-m. Thus, the screw 100 has a better penetrating force, and does not easily experience a pause during the screwing operation. Further, in Chart 2, the height of the head of the screw 100 from the outer surface of the object is smaller than that of the conventional double-thread screw. This means that the screw 100 couples more tightly with the composite material and the wood material than the conventional double-thread screw. Hence, the screw 100 is not likely to become loose by an external force.

From the aforementioned description, it is apparent that the screw 100 of the present invention has many advantages that can be summarized as follows:

1. Through the different directions of the first helical thread 41, the non-helical first ridge 43, and the second helical thread 42, the shavings can be cut twice so as to have a fine texture. Further, since the shavings held inside the materials 5, 6 are fine, the screw 100 can couple tightly with the first and second materials 5, 6 after driving into the same because the shavings can be compressed. As such, the screw 100 is not likely to become loose by an external force.

2. Since the first helical thread 41 and the non-helical first ridge 43 can efficiently break and cut the fiber textures of the shavings so that the shavings have a fine texture, entanglement between the shavings and the screw 100 is minimized, screwing resistance of the screw 100 is reduced, and the penetrating force of the screw 100 is enhanced.

Figure 4:
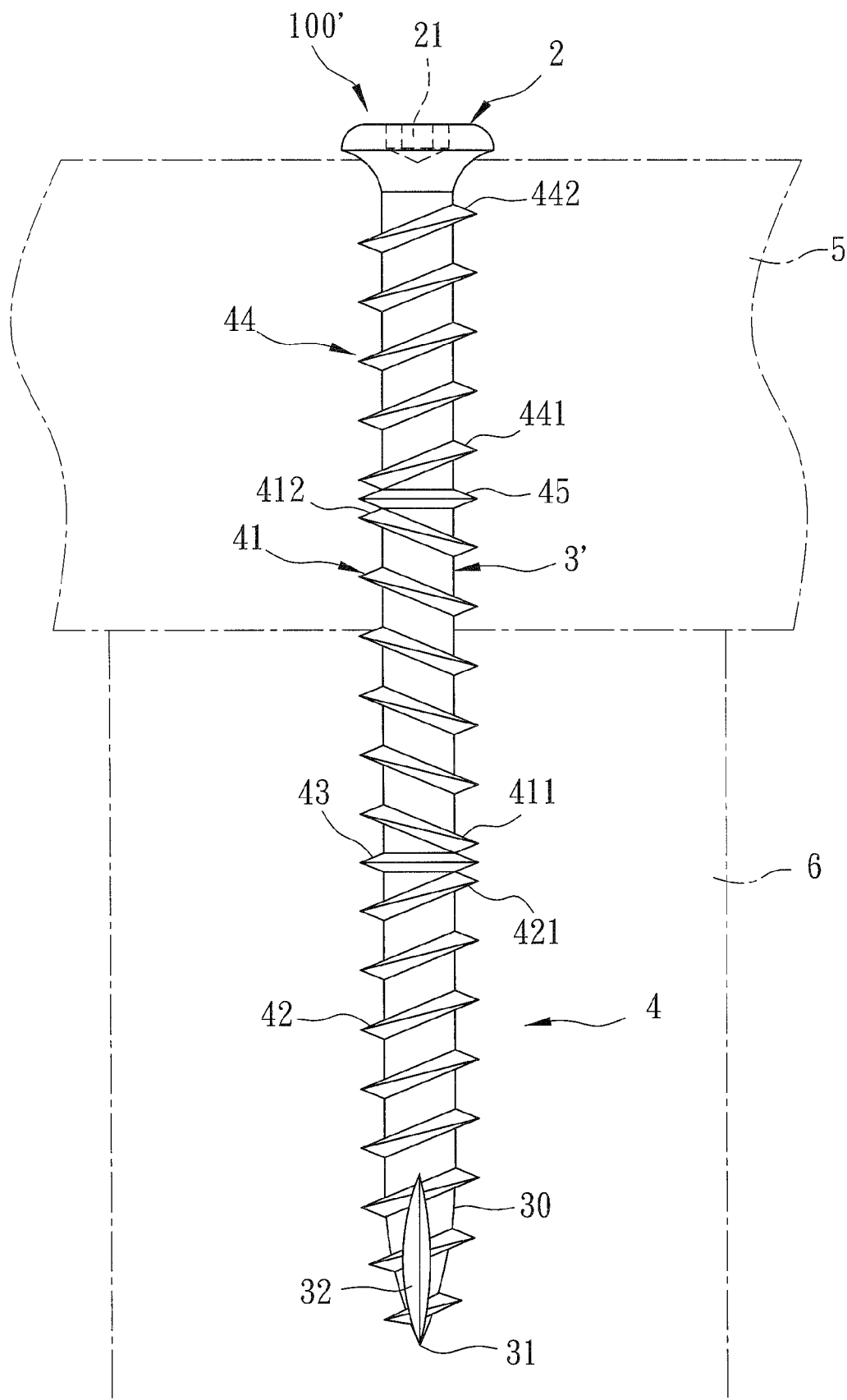
FIG. 4 is a schematic view of a screw according to the second preferred embodiment of the present invention.

Referring to FIG. 4, a screw 100' according to the second preferred embodiment of the present invention is shown to be similar to the first preferred embodiment. However, in this embodiment, the screw 100' further comprises a third helical thread 44 and a non-helical second ridge 45. The third helical thread 44 extends helically around the shank portion 3' between the head 2 and the first helical thread 41 in a direction which is the same as that of the second helical thread 42, and has a fifth end 441 proximate to the second end 412 of the first helical thread 41, and a sixth end 442 proximate to the head 2. The second ridge 45 extends around the shank portion 3' between the third and first helical threads 44, 41, and is spaced apart from the first ridge 43. In this embodiment, the second ridge 45 is in contact with the fifth end 441 of the third helical thread 44 and the second end 412 of the first helical thread 41, and has a construction similar to that of the first ridge 43. The second end 412 of the first helical thread 41 is distal from the head 2. A tapered bottom section 30 of the shank portion 3' has a cutting flute 32 extending axially and upwardly from the tip 31.

Through the presence of the third helical thread 44, the length of the shank portion 3' is increased, so that the screw 100' can firmly couple with the first and second materials 5, 6, and cannot be easily loosened. Further, through the presence of the first ridge 43, which assists in pressing down the portion of the shavings produced by the second helical thread 42 and in cutting the shavings produced by the first helical thread 41, and the second ridge 45 which assists in pressing down a portion of the shavings produced by the first helical thread 41 and in cutting the shavings produced by the third helical thread 44, not only is the screw 100 prevented from loosening when subjected to an external force, entanglement between the screw 100 and the shavings does not occur. Moreover, the cutting flute 32 assists the screw 100' in cutting the shavings during rotation of the screw 100', so that the screwing resistance of the screw 100' is reduced, and the penetrating force of the screw 100' is enhanced.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A screw comprising:

a shank portion including a tapered bottom section having a tip;

a head on top of said shank portion;

a first helical thread extending helically around said shank portion in a first direction between said tip and said head, and having a first end distal from said head, and a second end opposite to said first end;

a second helical thread extending helically around said shank portion in a second direction between said first helical thread and said tip, and having a third end proximate to said first end of said first helical thread, said first and second directions being opposite to each other; and a non-helical first ridge extending around said shank portion between said first and second helical threads and having a major diameter substantially identical to that of each of said first and second helical threads, said non-helical first ridge including a single non-helical crest extending around said shank portion, and two inclined faces tapering from said single non-helical crest in opposite directions;

wherein said inclined faces of said first ridge are respectively in contact with said first end of said first helical thread and said third end of said second helical thread.

2. The screw of claim 1, wherein said second end of said first helical thread is proximate to said head, and said second helical thread further has a fourth end proximate to said tip.

3. The screw of claim 1, further comprising a third helical thread and a non-helical second ridge, said third helical thread extending helically around said shank portion between said head and said first helical thread in a direction which is the same as that of the second helical thread, and having a fifth end proximate to said second end of said first helical thread, said second ridge extending around said shank portion between said third helical thread and said first helical thread.

4. The screw of claim 3, wherein said second ridge is in contact with said fifth end of said third helical thread and said second end of said first helical thread, and said third helical thread further has a sixth end proximate to said head.

5. The screw of claim 1, wherein said tapered bottom section has a cutting flute extending axially and upwardly from said tip.

* * * * *